United States Patent
Anderson et al.

(10) Patent No.: US 9,038,063 B2
(45) Date of Patent: May 19, 2015

(54) DETERMINING VIRTUAL MACHINE IMAGE PATTERN DISTRIBUTIONS IN A NETWORKED COMPUTING ENVIRONMENT

(75) Inventors: Jason L. Anderson, San Jose, CA (US); Gregory J. Boss, Saginaw, MI (US); Jeffrey L. Coveyduc, San Jose, CA (US); Christopher W. Roach, San Jose, CA (US)

(73) Assignee: International Business Machines Corporation, Armonk, NY (US)

( * ) Notice: Subject to any disclaimer, the term of this patent is extended or adjusted under 35 U.S.C. 154(b) by 158 days.

(21) Appl. No.: 13/227,261

(22) Filed: Sep. 7, 2011

(65) Prior Publication Data

US 2013/0061221 A1 Mar. 7, 2013

(51) Int. Cl.
*G06F 9/455* (2006.01)
*G06F 9/50* (2006.01)

(52) U.S. Cl.
CPC .......... *G06F 9/45558* (2013.01); *G06F 9/5077* (2013.01); *G06F 2009/45562* (2013.01)

(58) Field of Classification Search
None
See application file for complete search history.

(56) References Cited

U.S. PATENT DOCUMENTS

| | | | |
|---|---|---|---|
| 5,093,912 A | 3/1992 | Dong et al. | |
| 7,516,457 B2 | 4/2009 | Eilam et al. | |
| 7,577,722 B1 | 8/2009 | Khandekar et al. | |
| 7,809,831 B2 | 10/2010 | Matsumitsu et al. | |
| 8,533,103 B1 * | 9/2013 | Certain et al. | 705/37 |
| 2004/0030882 A1 | 2/2004 | Forman | |
| 2006/0159014 A1 | 7/2006 | Breiter et al. | |
| 2007/0214455 A1 | 9/2007 | Williams et al. | |
| 2007/0294676 A1 * | 12/2007 | Mellor et al. | 717/139 |
| 2008/0201711 A1 * | 8/2008 | Amir Husain | 718/1 |
| 2008/0244579 A1 * | 10/2008 | Muller | 718/100 |
| 2008/0263553 A1 * | 10/2008 | Lueck et al. | 718/102 |
| 2009/0276771 A1 | 11/2009 | Nickolov et al. | |
| 2010/0269109 A1 * | 10/2010 | Cartales | 718/1 |
| 2011/0138047 A1 | 6/2011 | Brown et al. | |

FOREIGN PATENT DOCUMENTS

| | | |
|---|---|---|
| EP | 0 362 107 A2 | 4/1990 |
| WO | 2009/108344 A1 | 9/2009 |
| WO | 2012/087104 A1 | 6/2012 |

OTHER PUBLICATIONS

Zhu, J. et al, "Twinkle: A Fast Resource Provisioning Mechanism for Internet Services", Zhenxiao.com, pp. 1-9. No publication date cited.
Maitland, J., "Keeping Control isn't Easy", Chapter 4: Cloud-Based Infrastructure, SearchCloudComputing.com, 13 pages.

(Continued)

*Primary Examiner* — Emerson Puente
*Assistant Examiner* — Dong Kim
(74) *Attorney, Agent, or Firm* — William E. Schiesser; Keohane & D'Alessandro PLLC; Maxine L. Barasch (57) ABSTRACT

Embodiments of the present invention provide an approach for determining distributions of virtual machine (VM) patterns across pools of VM instances based upon historical data (e.g., to achieve faster provisioning times). In a typical embodiment, a total pool size for a pool of VM instances is determined (e.g., based on historical data). Then, a distribution of a set of VM instance patterns across the pool is determined (e.g., also based upon historical data). Once the distribution has been determined, the pool of VM instances may be provisioned according to the distribution.

13 Claims, 8 Drawing Sheets

(56) References Cited

OTHER PUBLICATIONS

Mell et al., "The NIST Definition of Cloud Computing", National Institute of Standards and Technology, Information Technology Laboratory, Version 15, Oct. 7, 2009, 2 pages.

Alessandro Potenza, UK Combined Search and Examination Report, Oct. 10, 2012, Application No. GB1210253.9, 5 pages.

Chieu et al, Dynamic Scaling of Web Applications in a Virtualized Cloud Computing Environment, ICEBE 2009, pp. 281-286.

* cited by examiner

DETERMINING VIRTUAL MACHINE IMAGE PATTERN DISTRIBUTIONS IN A NETWORKED COMPUTING ENVIRONMENT

TECHNICAL FIELD

In general, the present invention relates to virtual machine (VM) pattern distribution determination in a networked computing environment (e.g., a cloud computing environment). Specifically, the present invention relates to the determination of VM instance patterns across a pool of VM instances based upon historical data.

BACKGROUND

The networked computing environment (e.g., cloud computing environment) is an enhancement to the predecessor grid environment, whereby multiple grids and other computation resources may be further enhanced by one or more additional abstraction layers (e.g., a cloud layer), thus making disparate devices appear to an end-consumer as a single pool of seamless resources. These resources may include such things as physical or logical computing engines, servers and devices, device memory, storage devices, among others.

Cloud computing services are typically rendered within a relatively static hardware pool whereby operating systems and applications are deployed and reconfigured to meet the computational demands of consumers. Within the cloud environment's boundaries, application images can be installed and overwritten, Internet Protocol (IP) addresses may be modified, and real and virtual processors may be allocated to meet changing business needs. Presently, different cloud service providers may take varying amounts of time to provision virtual machines requested by consumers. For example, some cloud providers may provision a particular resource in a matter of seconds, while others may take hours. The differences in provisioning speeds are generally caused by at least three factors: the type of storage architecture, the architecture of the cloud management platform, and/or the methods used to provision resources. As such, challenges can exist in achieving efficient computing resource provisioning times.

SUMMARY

In general, embodiments of the present invention provide an approach for determining distributions of virtual machine (VM) patterns across pools of VM instances based upon historical data (e.g., to achieve faster provisioning times). In a typical embodiment, a total pool size for a pool of VM instances is determined (e.g., based on historical data). Then, a distribution of a set of VM instance patterns across the pool is determined (e.g., also based upon historical data). Once the distribution has been determined, the pool of VM instances may be provisioned according to the distribution. In one embodiment, the VM patterns may be evenly distributed across the pool. In another embodiment, the VM patterns may be distributed according to percentages with which the VM patterns were previously requested. In yet another embodiment, the VM patterns may be grouped into two or more groups that are associated with particular user/customer level(s) (e.g., privilege and/or permission level, a service level purchased and/or specified by the consumer, etc).

A first aspect of the present invention provides a computer-implemented method for determining pattern distributions across a pool of virtual machine (VM) images in a networked computing environment, comprising: determining a total pool size for a pool of VM instances; determining a distribution of a set of VM instance patterns across the pool based upon historical data accessed from at least one computer storage medium; and provisioning the pool of VM instances in the networked computing environment according to the distribution.

A second aspect of the present invention provides a system for determining pattern distributions across a pool of virtual machine (VM) images in a networked computing environment, comprising: a memory medium comprising instructions; a bus coupled to the memory medium; and a processor coupled to the bus that when executing the instructions causes the system to: determine a total pool size for a pool of VM instances; determine a distribution of a set of VM instance patterns across the pool based upon historical data accessed from at least one computer storage medium; and provision the pool of VM instances in the networked computing environment according to the distribution.

A third aspect of the present invention provides a computer program product for determining pattern distributions across a pool of virtual machine (VM) images in a networked computing environment, the computer program product comprising a computer readable storage media, and program instructions stored on the computer readable storage media, to: determine a total pool size for a pool of VM instances; determine a distribution of a set of VM instance patterns across the pool based upon historical data accessed from at least one computer storage medium; and provision the pool of VM instances in the networked computing environment according to the distribution.

A fourth aspect of the present invention provides a method for deploying a system for determining pattern distributions across a pool of virtual machine (VM) images in a networked computing environment, comprising: providing a computer infrastructure being operable to: determine a total pool size for a pool of VM instances; determine a distribution of a set of VM instance patterns across the pool based upon historical data accessed from at least one computer storage medium; and provision the pool of VM instances in the networked computing environment according to the distribution.

BRIEF DESCRIPTION OF THE DRAWINGS

These and other features of this invention will be more readily understood from the following detailed description of the various aspects of the invention taken in conjunction with the accompanying drawings in which.

The drawings are not necessarily to scale. The drawings are merely schematic representations, not intended to portray specific parameters of the invention. The drawings are intended to depict only typical embodiments of the invention, and therefore should not be considered as limiting the scope of the invention. In the drawings, like numbering represents like elements.

DETAILED DESCRIPTION

Illustrative embodiments will now be described more fully herein with reference to the accompanying drawings, in which exemplary embodiments are shown. This disclosure may, however, be embodied in many different forms and should not be construed as limited to the exemplary embodiments set forth herein. Rather, these exemplary embodiments are provided so that this disclosure will be thorough and complete and will fully convey the scope of this disclosure to those skilled in the art. In the description, details of well-known features and techniques may be omitted to avoid unnecessarily obscuring the presented embodiments.

The terminology used herein is for the purpose of describing particular embodiments only and is not intended to be limiting of this disclosure. As used herein, the singular forms "a", "an", and "the" are intended to include the plural forms as well, unless the context clearly indicates otherwise. Furthermore, the use of the terms "a", "an", etc., do not denote a limitation of quantity, but rather denote the presence of at least one of the referenced items. The term "set" is intended to mean a quantity of at least one. It will be further understood that the terms "comprises" and/or "comprising", or "includes" and/or "including", when used in this specification, specify the presence of stated features, regions, integers, steps, operations, elements, and/or components, but do not preclude the presence or addition of one or more other features, regions, integers, steps, operations, elements, components, and/or groups thereof.

As indicated above, In general, embodiments of the present invention provide an approach for determining distributions of virtual machine (VM) patterns across pools of VM instances based upon historical data (e.g., to achieve faster provisioning times). In a typical embodiment, a total pool size for a pool of VM instances is determined (e.g., based on historical data). Then, a distribution of a set of VM instance patterns across the pool is determined (e.g., also based upon historical data). Once the distribution has been determined, the pool of VM instances may be provisioned according to the distribution. In one embodiment, the VM patterns may be evenly distributed across the pool. In another embodiment, the VM patterns may be distributed according to percentages with which the VM patterns were previously requested. In yet another embodiment, the VM patterns may be grouped into two or more groups that are associated with particular user/customer level(s) (e.g., privilege and/or permission level, a service level purchased and/or specified by the consumer, etc).

It is understood in advance that although this disclosure includes a detailed description of cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed, automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active consumer accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based email). The consumer does not manage or control the underlying cloud infrastructure including network, servers, operating systems, storage, or even individual application capabilities, with the possible exception of limited consumer-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application-hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Figure 1:
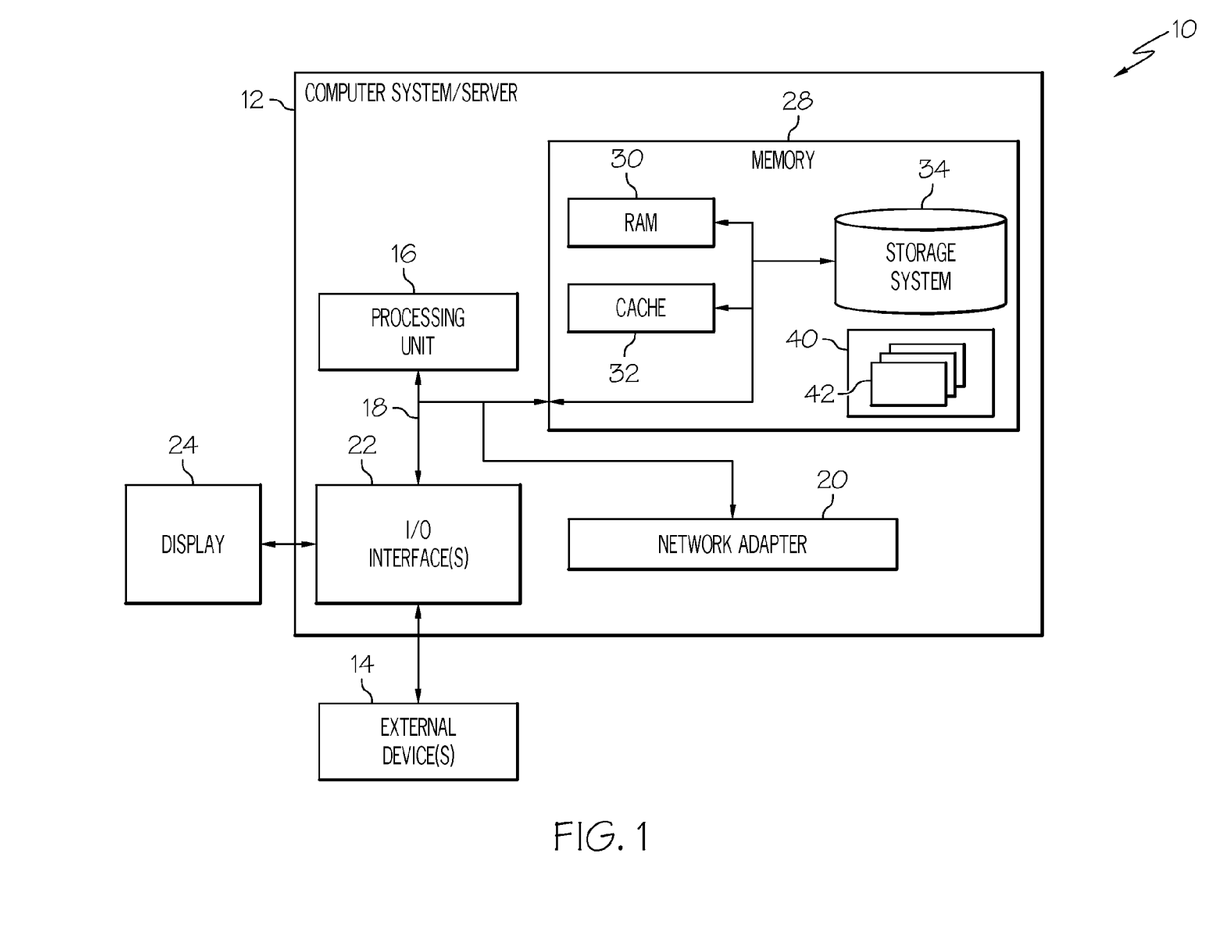
FIG. 1 depicts a cloud computing node according to an embodiment of the present invention.

Referring now to FIG. 1, a schematic of an example of a cloud computing node is shown. Cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove.

In cloud computing node 10, there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, computer system/server 12 in cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM, or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

The embodiments of the invention may be implemented as a computer readable signal medium, which may include a propagated data signal with computer readable program code embodied therein (e.g., in baseband or as part of a carrier wave). Such a propagated signal may take any of a variety of forms including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium including, but not limited to, wireless, wireline, optical fiber cable, radio-frequency (RF), etc., or any suitable combination of the foregoing.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a consumer to interact with computer system/server 12; and/or any devices (e.g., network card, modem, etc.) that enable computer system/server 12 to communicate with one or more other computing devices. Such communication can occur via I/O interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples include, but are not limited to: microcode, device drivers, redundant processing units, external disk drive arrays, RAID systems, tape drives, and data archival storage systems, etc.

Figure 2:
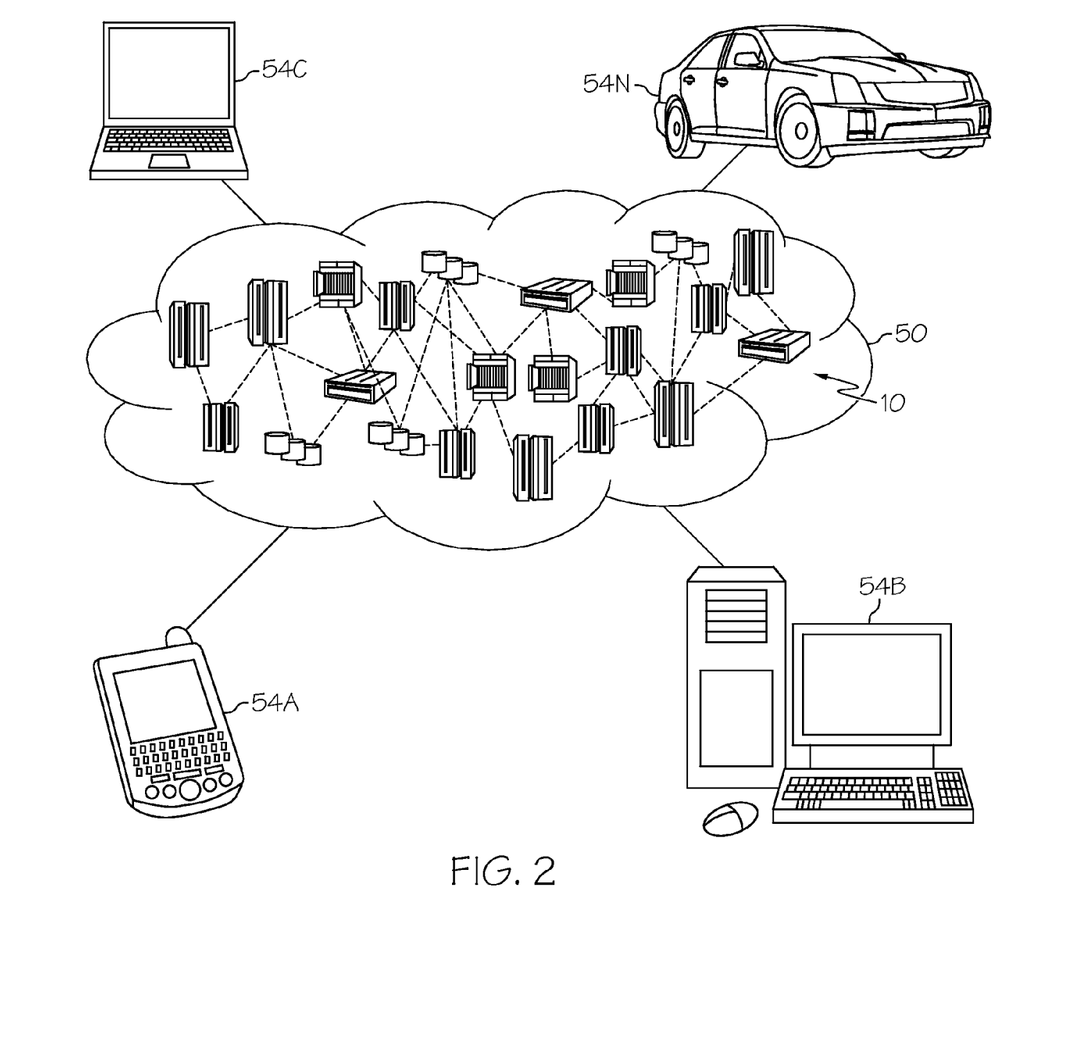
FIG. 2 depicts a cloud computing environment according to an embodiment of the present invention.

Referring now to FIG. 2, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as private, community, public, or hybrid clouds as described hereinabove, or a combination thereof. This allows cloud computing environment 50 to offer infrastructure, platforms, and/or software as services for which a cloud consumer does not need to maintain resources on a local computing device. It is understood that the types of computing devices 54A-N shown in FIG. 2 are intended to be illustrative only and that computing nodes 10 and cloud computing environment 50 can communicate with any type of computerized device over any type of network and/or network addressable connection (e.g., using a web browser).

Figure 3:
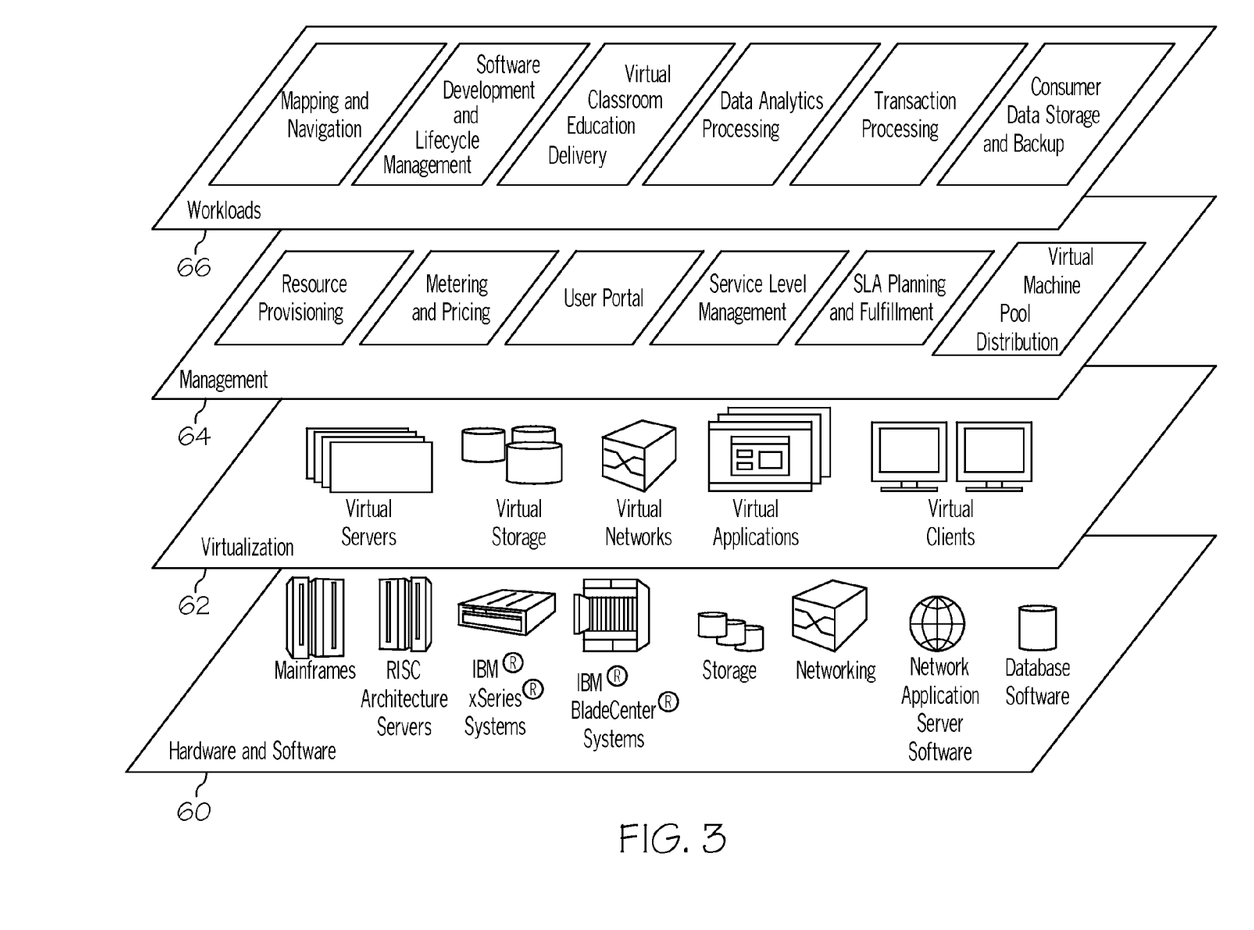
FIG. 3 depicts abstraction model layers according to an embodiment of the present invention.

Referring now to FIG. 3, a set of functional abstraction layers provided by cloud computing environment 50 (FIG. 2) is shown. It should be understood in advance that the components, layers, and functions shown in FIG. 3 are intended to be illustrative only and embodiments of the invention are not limited thereto. As depicted, the following layers and corresponding functions are provided:

Hardware and software layer 60 includes hardware and software components. Examples of hardware components include mainframes. In one example, IBM® zSeries® systems and RISC (Reduced Instruction Set Computer) architecture based servers. In one example, IBM pSeries® systems, IBM xSeries® systems, IBM BladeCenter® systems, storage devices, networks, and networking components. Examples of software components include network application server software. In one example, IBM WebSphere® application server software and database software. In one example, IBM DB2® database software. (IBM, zSeries, pSeries, xSeries, BladeCenter, WebSphere, and DB2 are trademarks of International Business Machines Corporation registered in many jurisdictions worldwide.)

Virtualization layer 62 provides an abstraction layer from which the following examples of virtual entities may be provided: virtual servers; virtual storage; virtual networks, including virtual private networks; virtual applications and operating systems; and virtual clients.

In one example, management layer 64 may provide the functions described below. Resource provisioning provides dynamic procurement of computing resources and other resources that are utilized to perform tasks within the cloud computing environment. Metering and pricing provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. Consumer portal provides access to the cloud computing environment for consumers and system administrators. Service level management provides cloud computing resource allocation and management such that required service levels are met. Service Level Agreement (SLA) planning and fulfillment provides pre-arrangement for, and procurement of, cloud computing resources for which a future requirement is anticipated in accordance with an SLA. Further shown in management layer is virtual machine pool distribution function, which represents the functionality that is provided under the embodiments of the present invention.

Workloads layer 66 provides examples of functionality for which the cloud computing environment may be utilized. Examples of workloads and functions which may be provided from this layer include: mapping and navigation; software development and lifecycle management; virtual classroom education delivery; data analytics processing; transaction processing; and consumer data storage and backup. As mentioned above, all of the foregoing examples described with respect to FIG. 3 are illustrative only, and the invention is not limited to these examples.

It is understood that all functions of the present invention as described herein typically may be performed by the virtual machine pool distribution functionality of management layer 64, which can be tangibly embodied as modules of program code 42 of program/utility 40 (FIG. 1). However, this need not be the case. Rather, the functionality recited herein could be carried out/implemented and/or enabled by any of the layers 60-66 shown in FIG. 3.

It is reiterated that although this disclosure includes a detailed description on cloud computing, implementation of the teachings recited herein are not limited to a cloud computing environment. Rather, the embodiments of the present invention are intended to be implemented with any type of networked computing environment now known or later developed.

Figure 4:
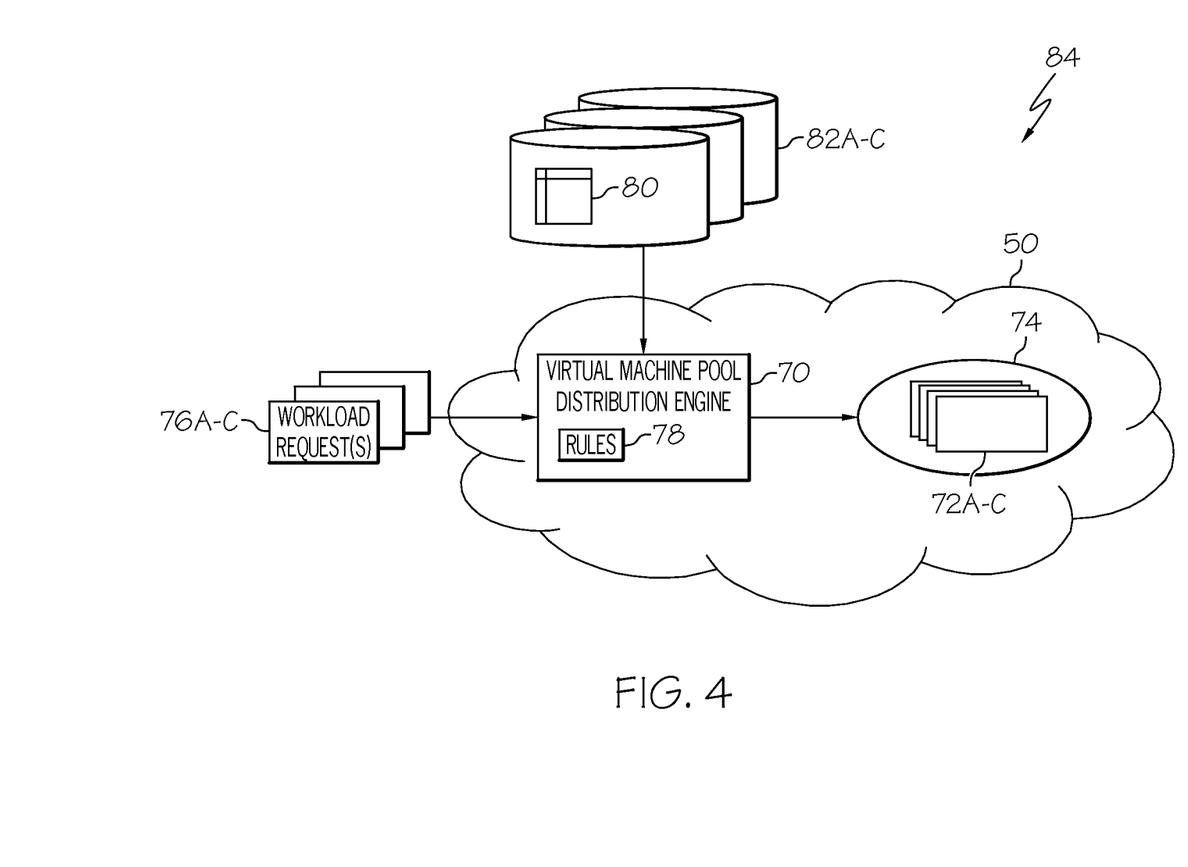
FIG. 4 depicts a system diagram according to an embodiment of the present invention.

Referring now to FIG. 4, a system diagram according to an aspect of the present invention is shown. As depicted, a virtual machine pool distribution engine (engine 70) is shown within networked computing environment 84 (e.g., comprising cloud computing environment 50). In general, engine 70 can be implemented as program 40 on computer system 12 of FIG. 1 and can implement the functions recited herein as depicted in management layer 64 of FIG. 3. In general, engine 70 (in one embodiment) comprises a rules and/or computational engine that processes a set (at least one) of rules 78 and/or performs a set of computations that utilizes historical data 80 stored in a set of computer storage medium(s) 82A-C to determine a distribution of VM instance patterns across a pool 74 of VM instances 72A-C to process/handle one or more workload requests 76A-C.

Along these lines, engine 70 may perform multiple functions similar to a general-purpose computer using rules 78. Specifically, among other functions, engine 70 may: determine a total pool size for a pool of VM instances; determine a distribution of a set of VM instance patterns across the pool based upon historical data accessed from at least one computer storage medium; and/or provision the pool of VM instances in the networked computing environment according to the distribution. In determining the distribution, engine 70 may further apply one or more probabilistic techniques that result in VM instance patterns being: evenly distributed across pool 74, distributed according to percentages with which the patterns were previously requested, and/or grouped into one or more user/customer level-based groups.

Figure 5:
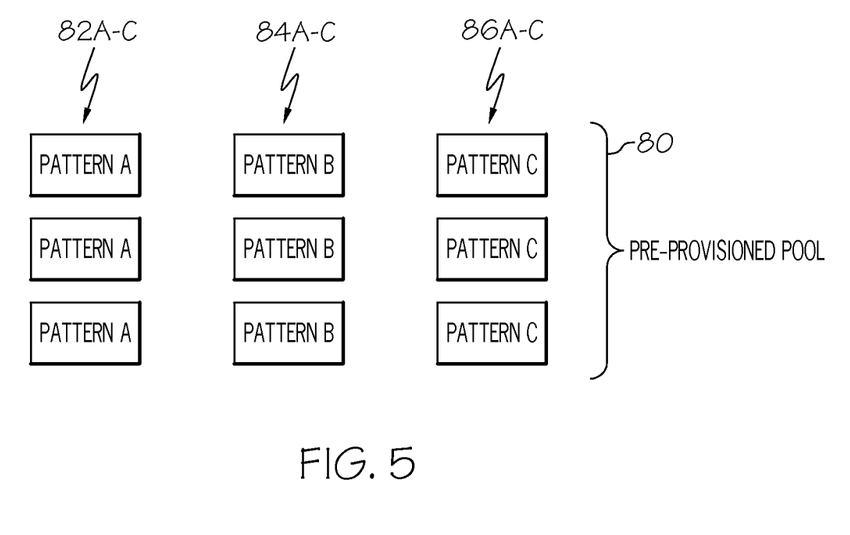
FIG. 5 depicts a pool of virtual machine instances pre-provisioned according to an embodiment of the present invention.

Regardless, the functions of engine 70 will now be explained in further detail. In general, engine 70 determines which images/instances and software (e.g., VMs) should get pre-provisioned on hardware components that are not currently in use (e.g., total pool size). Engine 70 also determines what portion of unused hardware should receive a pre-provisioning assignment. Depending on the cloud environment's pre-provisioning capabilities, this may be up to 100% of the unused hardware. Shown below are multiple methods for pre-provisioning pool 74 of VM instances 72A-C. Specifically, the various methods below describe different approaches for determining distribution of VM instance patterns among pool 74. For each of the methods shown below, the following parameters are utilized:

x=The number of VMs to be provisioned
ph=Prior history of provisioned VM instances Method 1—X-Deep Pre-Provisioning:

Referring now to FIG. 5, an illustrative pool 80 of VM instance patterns 82A-C, 84A-C, and 86A-C are shown. Under this illustrative example, historical data 80 (FIG. 4) has indicated that three patterns "A," "B," and "C" have previously been requested/needed (e.g., to process workload request(s) 76A-C or similar variants thereof) and a total pool size of nine. Under this method, the three patterns will be distributed evenly throughout pool 80. As shown, three instances of patterns "A," "B," and "C" have been provisioned in pool 80. Below is an illustrative algorithm for this method:

1. For each distinct instance i in prior history ph do:
2. preprovision(i, x)

Figure 6:
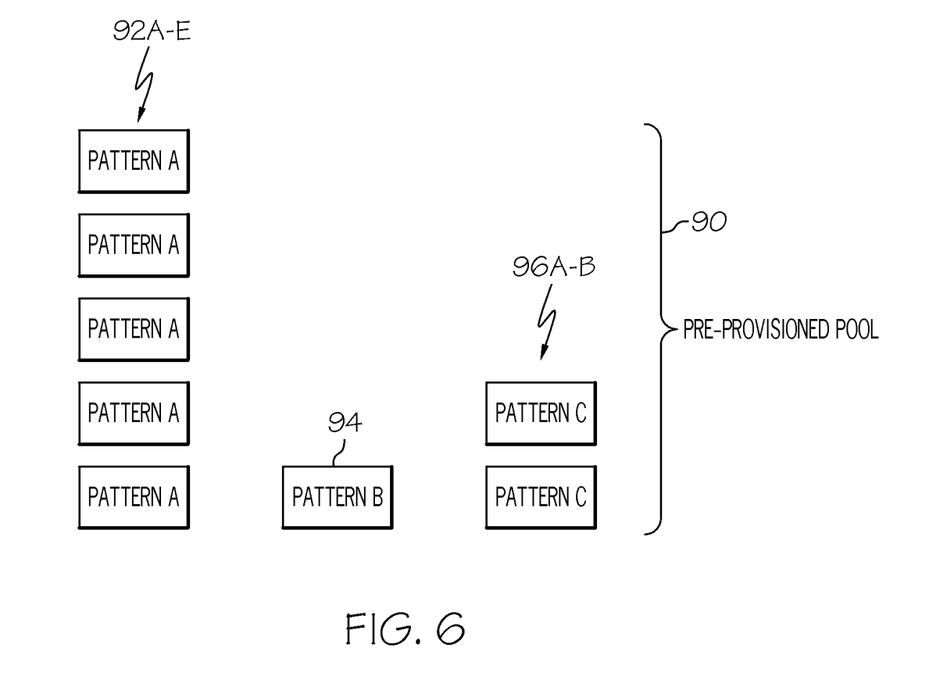
FIG. 6 depicts a pool of virtual machine instances pre-provisioned according to another embodiment of the present invention.

Method 2—X-Deep Pre-Provisioning with Probability:

With this method, engine 70 (FIG. 4) will analyze the software packages available, the possible combinations of those packages, and the percentages of previously provisioned VM instances that were provisioned based on each package. With this information, engine 70 will adjust the pre-provisioned pool to best match the "popularity" of the package combinations, ensuring the most popular combinations are available in the greatest percentages and available to be provisioned most quickly. As shown in FIG. 6, this may result in a more distributed configuration of VM instance patterns 92A-E, 94, and 96A-B than the even distribution depicted in FIG. 5. Specifically, as depicted, there are a total of eight VM instance patterns in pool 90 (as determined from historical data) distributed as follows: a quantity of five for VM instance pattern 92A-E, a quantity of one for instance pattern 94, and a quantity of two for VM instance pattern 96A-B. This distribution is based on historical data that indicated pattern "A" occurred in ⅝ or 62.5% of previous provisioning operations, pattern "B" occurred in ⅛ or 12.5% of previous provisioning operations, while pattern "C" occurred in ⅖ or 25% of previous provisioning operations (as determined from historical data 80 of FIG. 4). Shown below is an illustrative algorithm provided under this method: preprovision(imageToProvision, numberToProvision):

1) for int i=0; i<numberToProvision; i++do:
2) provisionToPreprovisionPool(imageToProvision)

Method 3—Pool Segmentation by Customer Group

Figure 7:
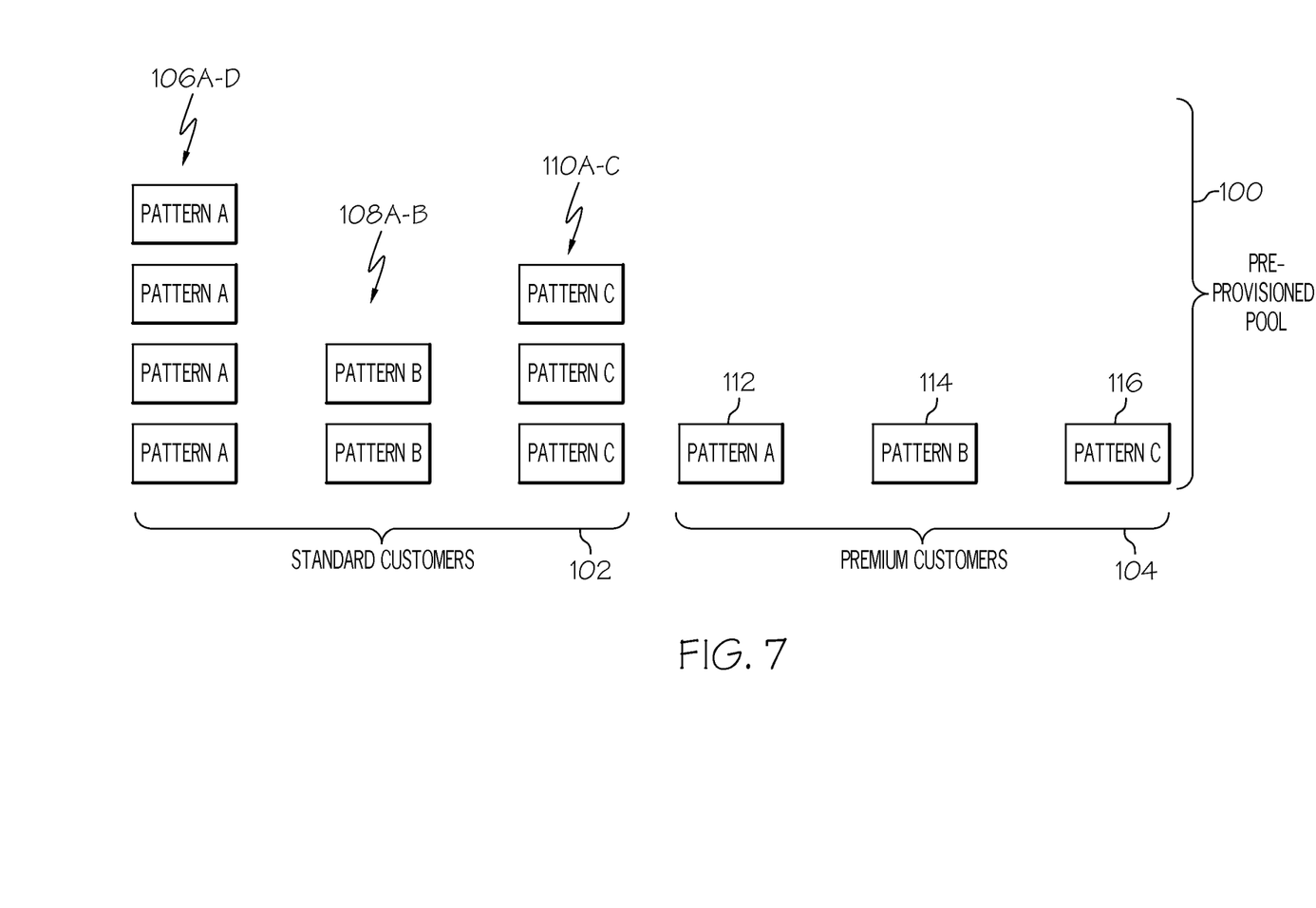
FIG. 7 depicts a pool of virtual machine instances pre-provisioned according to another embodiment of the present invention.

This method may augment either of the above methods by sub-partitioning the pre-provisioned pool into segments or groups. Each group may be assigned to a particular group of users/customer. In one embodiment, this method could be applied if the dynamics and history are significantly different between two or more groups. For example, this method could be used to give a guaranteed resources pool to "VIP" or premium customers as shown in FIG. 7. As shown, pool 100 can include multiple distributions over multiple groups 102 and 104. For example, group 102 (standard customers) has pattern distributions 106A-D, 108A-B, and 110A-C, while group 104 (premium customers) has pattern distributions 112, 114, and 116. These illustrative scenarios allow premium users to have a special reserved pool upon which only they draw. This would allow the normal pre-provisioned pool to be exhausted while still guaranteeing that a premium group user would have substantially instant access to a VM instance. In general, customer levels and associated groups can be determined according to multiple techniques. For example, customer levels could be: assigned by a cloud environment provider, purchased by the customer, etc.

Figure 8:
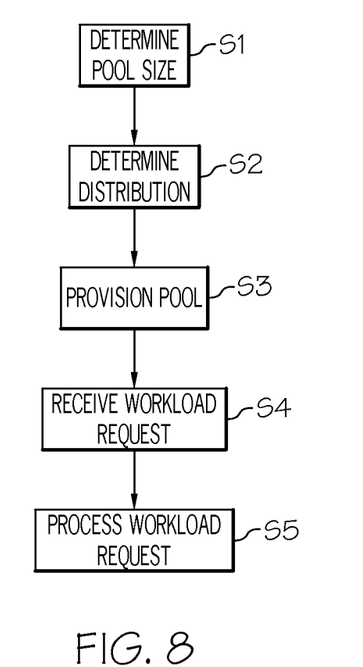
FIG. 8 depicts a method flow diagram according to an embodiment of the present invention.

Referring now to FIG. 8, a method flow diagram according to an embodiment of the present invention is shown. As depicted, in step S1, a size of a pool of VM instances is determined. In step S2, a distribution of VM instance patterns in the pool is determined (e.g., even distribution, historical percentage-based distribution, group-based distribution, etc.). In step S3, the pool of VM instances is provisioned according to the distribution of VM instance patterns. In step S4, a workload request is received, and is processed in step S5 using at least one VM instance from the pool.

While shown and described herein as a VM pool distribution solution, it is understood that the invention further provides various alternative embodiments. For example, in one embodiment, the invention provides a computer-readable/useable medium that includes computer program code to enable a computer infrastructure to provide VM pool distribution functionality as discussed herein. To this extent, the computer-readable/useable medium includes program code that implements each of the various processes of the invention. It is understood that the terms computer-readable medium or computer-useable medium comprise one or more of any type of physical embodiment of the program code. In particular, the computer-readable/useable medium can comprise program code embodied on one or more portable storage articles of manufacture (e.g., a compact disc, a magnetic disk, a tape, etc.), on one or more data storage portions of a computing device, such as memory 28 (FIG. 1) and/or storage system 34 (FIG. 1) (e.g., a fixed disk, a read-only memory, a random access memory, a cache memory, etc.).

In another embodiment, the invention provides a method that performs the process of the invention on a subscription, advertising, and/or fee basis. That is, a service provider, such as a Solution Integrator, could offer to provide VM pool distribution functionality. In this case, the service provider can create, maintain, support, etc., a computer infrastructure, such as computer system 12 (FIG. 1) that performs the processes of the invention for one or more consumers. In return, the service provider can receive payment from the consumer(s) under a subscription and/or fee agreement and/or the service provider can receive payment from the sale of advertising content to one or more third parties.

In still another embodiment, the invention provides a computer-implemented method for VM pool distribution. In this case, a computer infrastructure, such as computer system 12 (FIG. 1), can be provided, and one or more systems for performing the processes of the invention can be obtained (e.g., created, purchased, used, modified, etc.) and deployed to the computer infrastructure. To this extent, the deployment of a system can comprise one or more of: (1) installing program code on a computing device, such as computer system 12 (FIG. 1), from a computer-readable medium; (2) adding one or more computing devices to the computer infrastructure; and (3) incorporating and/or modifying one or more existing systems of the computer infrastructure to enable the computer infrastructure to perform the processes of the invention.

As used herein, it is understood that the terms "program code" and "computer program code" are synonymous and mean any expression, in any language, code, or notation, of a set of instructions intended to cause a computing device having an information processing capability to perform a particular function either directly or after either or both of the following: (a) conversion to another language, code, or notation; and/or (b) reproduction in a different material form. To this extent, program code can be embodied as one or more of: an application/software program, component software/a library of functions, an operating system, a basic device system/driver for a particular computing device, and the like.

A data processing system suitable for storing and/or executing program code can be provided hereunder and can include at least one processor communicatively coupled, directly or indirectly, to memory elements through a system bus. The memory elements can include, but are not limited to, local memory employed during actual execution of the program code, bulk storage, and cache memories that provide temporary storage of at least some program code in order to reduce the number of times code must be retrieved from bulk storage during execution. Input/output and/or other external devices (including, but not limited to, keyboards, displays, pointing devices, etc.) can be coupled to the system either directly or through intervening device controllers.

Network adapters also may be coupled to the system to enable the data processing system to become coupled to other data processing systems, remote printers, storage devices, and/or the like, through any combination of intervening private or public networks. Illustrative network adapters include, but are not limited to, modems, cable modems, and Ethernet cards.

The foregoing description of various aspects of the invention has been presented for purposes of illustration and description. It is not intended to be exhaustive or to limit the invention to the precise form disclosed and, obviously, many modifications and variations are possible. Such modifications and variations that may be apparent to a person skilled in the art are intended to be included within the scope of the invention as defined by the accompanying claims.

What is claimed is:

1. A computer-implemented method for determining pattern distributions across a pool of virtual machine (VM) images in a cloud computing environment, comprising:
    determining a total pool size for a pool of VM instances in the cloud computing environment;
    accessing, from at least one computer storage medium, historical percentages with which a plurality of VM instance patterns were previously requested;
    determining a distribution of the plurality of VM instance patterns across the pool, in the cloud computing environment, based upon the historical percentages, wherein a subset of the VM instance patterns is reserved for provisioning to a set of users having associated levels of priority higher than another set of users;
    provisioning the pool of VM instances in the cloud computing environment according to the distribution and the associated levels of priority;
    receiving a workload request; and
    in response to the receiving, processing the workload request using at least one VM instance selected from the provisioned pool of VM instances;
    wherein the cloud computing environment comprises at least one cloud abstraction layer configured to make devices, on which VM instances of the pool of VM instances are deployable, provided by disparate cloud providers appear to an end-consumer as a single pool of seamless resources.

2. The computer-implemented method of claim 1, the distribution comprising an even distribution of the plurality of VM instance patterns across the pool.

3. The computer-implemented method of claim 1, the distribution comprising the plurality of VM instance patterns being grouped into a plurality of groups of VM instance patterns.

4. The computer-implemented method of claim 3, each of the plurality of groups of VM instance patterns pertaining to a particular customer level.

5. A system for determining pattern distributions across a pool, in the cloud computing environment, of virtual machine (VM) images in a cloud computing environment, comprising:
    a memory medium comprising instructions;
    a bus coupled to the memory medium; and
    a processor coupled to the bus that when executing the instructions causes the system to:
        determine a total pool size for a pool of VM instances in the cloud computing environment;
        access, from at least one computer storage medium, historical percentages with which a plurality of VM instance patterns were previously requested;
        determine a distribution of the plurality of VM instance patterns across the pool, in the cloud computing environment, based upon the historical percentages, wherein a subset of the VM instance patterns is reserved for provisioning to a set of users having associated levels of priority higher than another set of users;
        provision the pool of VM instances in the cloud computing environment according to the distribution and the associated levels of priority;
        receive a workload request; and
        in response to the receiving, process the workload request using at least one VM instance selected from the provisioned pool of VM instances;
        wherein the cloud computing environment comprises at least one cloud abstraction layer configured to make devices, on which VM instances of the pool of VM instances are deployable, provided by disparate cloud providers appear to an end-consumer as a single pool of seamless resources.

6. The system of claim 5, the distribution comprising an even distribution of the plurality of VM instance patterns across the pool.

7. The system of claim 5, the distribution comprising the set of VM instance patterns being grouped into a plurality of groups of VM patterns.

8. The system of claim 7, each of the plurality of groups of VM instance patterns pertaining to a particular customer level.

9. A computer program product for determining pattern distributions across a pool of virtual machine (VM) images in a cloud computing environment, the computer program product comprising a computer readable storage media, and program instructions stored on the computer readable storage media, to:
    determine a total pool size for a pool of VM instances in the cloud computing environment;
    access, from at least one computer storage medium, historical percentages with which a plurality of VM instance patterns were previously requested;
    determine a distribution of the plurality of VM instance patterns across the pool, in the cloud computing environment, based upon the historical percentages, wherein a subset of the VM instance patterns is reserved for provisioning to a set of users having associated levels of priority higher than another set of users;
    provision the pool of VM instances in the cloud computing environment according to the distribution and the associated levels of priority;
    receive a workload request; and in response to the receiving, process the workload request using at least one VM instance selected from the provisioned pool of VM instances;

wherein the cloud computing environment comprises at least one cloud abstraction layer configured to make devices, on which VM instances of the pool of VM instances are deployable, provided by disparate cloud providers appear to an end-consumer as a single pool of seamless resources.

10. The computer program product of claim 9, the distribution comprising an even distribution of the plurality of VM instance patterns across the pool.

11. The computer program product of claim 9, the distribution comprising the set of VM instance patterns being grouped into a plurality of groups of VM patterns.

12. The computer program product of claim 11, each of the plurality of groups of VM instance patterns pertaining to a particular customer level.

13. A method for deploying a system for determining pattern distributions across a pool of virtual machine (VM) images in a cloud computing environment, comprising:
providing a computer infrastructure being operable to:
determine a total pool size for a pool of VM instances in the cloud computing environment;
access, from at least one computer storage medium, historical percentages with which a plurality of VM instance patterns were previously requested;
determine a distribution of the plurality of VM instance patterns across the pool, in the cloud computing environment, based upon the historical percentages, wherein a subset of the VM instance patterns is reserved for provisioning to a set of users having associated levels of priority higher than another set of users;
provision the pool of VM instances in the cloud computing environment according to the distribution and the associated levels of priority;
receive a workload request; and
in response to the receiving, process the workload request using at least one VM instance selected from the provisioned pool of VM instances;
wherein the cloud computing environment comprises at least one cloud abstraction layer configured to make devices, on which VM instances of the pool of VM instances are deployable, provided by disparate cloud providers appear to an end-consumer as a single pool of seamless resources.

\* \* \* \* \*